No. 655,428. Patented Aug. 7, 1900.
T. E. WARDWELL.
HAND STRAP FOR STREET CARS.
(Application filed Feb. 3, 1900.)
(No Model.)
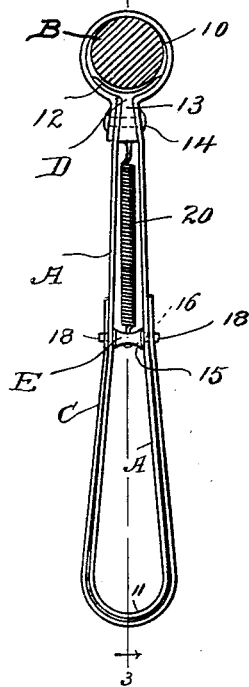
Fig. 1
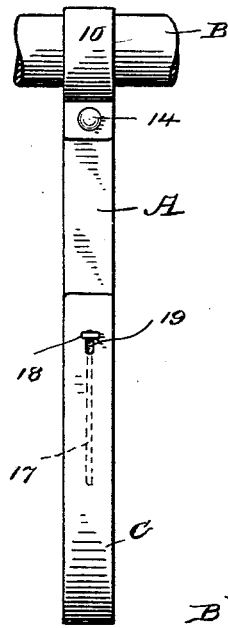
Fig. 2
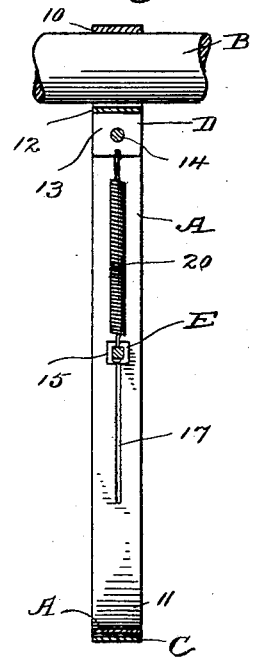
Fig. 3
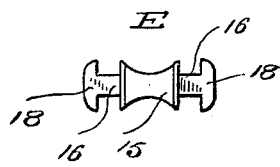
Fig. 5
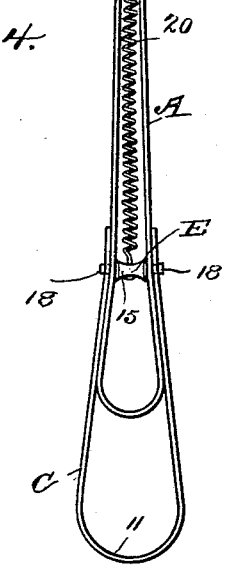
Fig. 4
Fig. 6
WITNESSES
H. A. Lamb
S. H. Atherton
INVENTOR
Theodore E. Wardwell
By A. M. Wooster
Atty.
THE NORRIS PETERS CO., PHOTO-LITHO., WASHINGTON, D. C.

UNITED STATES PATENT OFFICE.

THEODORE E. WARDWELL, OF STAMFORD, CONNECTICUT.

HAND-STRAP FOR STREET-CARS.

SPECIFICATION forming part of Letters Patent No. 655,428, dated August 7, 1900.

Application filed February 3, 1900. Serial No. 3,849. (No model.)

*To all whom it may concern:*

Be it known that I, THEODORE E. WARDWELL, a citizen of the United States, residing at Stamford, county of Fairfield, State of Connecticut, have invented a new and useful Hand-Strap for Street-Cars, of which the following is a specification.

My invention has for its object to provide a hand-strap for street-cars which will not hang down low enough to be seriously in the way of high hats and bonnets, but will be adapted to furnish a convenient handhold for a short person and which will, moreover, if required, furnish two independent handholds, one above the other and within the other, it being an essential requirement that the device as a whole be simple and inexpensive to make, as well as neat and attractive in appearance, and that it be so constructed as to be in the way as little as possible under all circumstances.

With these ends in view I have devised the simple and novel sliding hand-strap which I will now describe, referring to the accompanying drawings, forming part of this specification, and using reference characters to designate the several parts.

Figure 1 is an edge view of my novel hand-strap, the pole being in section; Fig. 2, a side elevation corresponding therewith; Fig. 3, a section on the line 3 3 in Fig. 1; Fig. 4, a view corresponding with Fig. 1, showing the manner in which the strap may be extended to accommodate a short person; Fig. 5, a view of the spreader detached, and Fig. 6 is a view of the shaper detached.

A denotes the main strap, which is adapted to slide on a pole B and the lower end of which is inclosed by an outer strap C. At the upper end of the main strap is an eye 10, through which the pole passes, the eye being expanded and retained in shape, so that the strap will slide freely on the pole, by means of a shaper D. The lower end of the main strap forms a hand-loop 11, the inner sides of the strap being separated and retained apart by means of a spreader E. The construction of the shaper will be readily understood from Fig. 6. It consists, essentially, of a curved portion 12, which lies within the eye and shapes it so that the eye will be prevented from collapsing and the strap will slide freely on the pole, and a shank 13, lying between the plies of the strap, both plies being rigidly secured thereto, as by a rivet or rivets 14 passing through both plies of the strap and through the shank, as clearly shown in Fig. 1, in which the two ends of the strap are also shown as secured together by the rivet 14. The spreader (see Fig. 5) consists of a body 15, which lies between the plies of the main strap, and shanks 16 on opposite sides of the body, which pass through slots 17 in the main strap and are provided with heads 18. These heads are shown as elongated and as lying at right angles to elongated openings 19 in outer strap C, the latter being at its normal position, so that in order to attach the outer strap in place or remove it it is simply necessary to place the ends thereof in such position that the openings 19 will be in alinement with heads 18, in which position the heads will pass through the openings, after which, in attaching, the outer strap may be allowed to fall to its normal position, as in the drawings, and will be retained there until it is turned to a position at right angles to its normal position for the purpose of removal. The shanks 16 of the spreader slide freely in slots 17 in the main strap when the outer strap is pulled down, as in Fig. 4, the outer strap being returned to its normal position and retained there, as in Figs. 1, 2, and 3, by means of a spring 20, the opposite ends of which are shown as connected to the shaper and to the spreader.

The operation will be readily understood from the drawings. If most convenient, a person will naturally place his hand in the hand-loop 11 of the main strap, the parts of my novel strap, as a whole, remaining in the position shown in Figs. 1, 2, and 3. If, however, the person desiring to steady himself by the strap is short or for any reason the extended position of the outer strap is most convenient, the person using it simply engages the outer strap and draws it down to the position shown in Fig. 4, where it is stopped by the engagement of the shanks with the lower ends of slots 17. The instant the user releases the outer strap the spring will draw it back to its normal position, as in Figs. 1, 2, and 3. Another important advantage of my novel strap is that it provides independent handholds for two persons, one hold being above the other and within the other, thereby avoiding clumsiness in appearance and awkward action in use and making it perfectly convenient for two persons to use the strap simultaneously and without contact of the hands.

It will of course be apparent that my novel strap will be operative without the shaper and that the outer strap, a spring, and a suitable spreader may be applied to straps already in use either with or without a shaper, it being of course immaterial in the broad sense just how the upper end of the spring is connected to the main strap.

Having thus described my invention, I claim—

1. In a device of the character described the combination with a main strap, of an outer strap inclosing the lower end of the main strap and adapted to slide thereon, and a spring acting to retain the outer strap at its retracted position.

2. In a device of the character described the combination with a main strap having slots 17, of an outer strap adapted to slide thereon, a spreader lying between the plies of the main strap and having shanks which pass through the slots and through openings in the outer strap, and are provided with heads which retain the outer strap in place and a spring acting to retain the outer strap at its retracted position.

3. In a device of the character described the combination with a main strap having slots 17, of an outer strap having elongated openings 19, a spreader lying between the plies of the main strap and having shanks which pass through said slots and openings and are provided with heads lying transversely to the openings so that the outer strap may be placed in position or removed by placing the openings and heads in alinement and a spring connected to the spreader and to the main strap by which the outer strap is normally held at its retracted position.

4. In a device of the character described the combination with a main strap having at its upper end an eye to receive a pole, of an outer strap inclosing the lower end of the main strap and adapted to slide thereon, a spreader between the plies of the main strap, a shaper in said eye whereby the latter is prevented from collapsing, and a spring whose ends are connected to said spreader and said shaper.

5. In a device of the character described the combination with a main strap having at its upper end an eye to receive a pole, of an outer strap inclosing the lower end of the main strap and adapted to slide thereon, a spreader between the plies of the main strap, a shaper comprising a curved portion lying within the eye, and a shank to which the plies of the strap are attached and a spring whose ends are connected to the spreader and shaper respectively.

6. The spreader E having two shanks 16 and heads 18, substantially as shown, for the purpose specified.

7. The spreader E comprising a body 15, two shanks 16 extending therefrom and elongated heads 18 at the ends of the shanks.

In testimony whereof I affix my signature in presence of two witnesses.

THEODORE E. WARDWELL.

Witnesses:
HELEN L. HOYT,
ANNIE A. HOYT.